US007034187B2

(12) United States Patent
Parthiban

(10) Patent No.: US 7,034,187 B2
(45) Date of Patent: Apr. 25, 2006

(54) POLY(ARALKYL KETONE)S AND METHODS OF PREPARING THE SAME

(75) Inventor: Anbanandam Parthiban, Jurong Island (SG)

(73) Assignee: Agency for Science, Technology, and Research, Singapore (SG)

( * ) Notice: Subject to any disclaimer, the term of this patent is extended or adjusted under 35 U.S.C. 154(b) by 0 days.

(21) Appl. No.: 10/859,689

(22) Filed: Jun. 2, 2004

(65) Prior Publication Data

US 2005/0272905 A1 Dec. 8, 2005

(51) Int. Cl.
*C07C 49/213* (2006.01)
*C08G 14/00* (2006.01)
*C08G 10/00* (2006.01)
*C08G 63/00* (2006.01)

(52) U.S. Cl. ...................... 568/308; 528/125; 528/126; 528/223; 528/271

(58) Field of Classification Search ................ 528/125, 528/126, 223, 271; 568/308
See application file for complete search history.

(56) References Cited

U.S. PATENT DOCUMENTS

| 4,229,564 | A | * | 10/1980 | Dahl | ........................... 528/175 |
|---|---|---|---|---|---|
| 4,820,792 | A | | 4/1989 | Towle | |
| 5,155,203 | A | | 10/1992 | Darnell et al. | |
| 5,288,834 | A | | 2/1994 | Roovers et al. | |
| 5,344,914 | A | | 9/1994 | Gibson et al. | |
| 5,442,029 | A | | 8/1995 | Gibson et al. | |
| 6,538,098 | B1 | | 3/2003 | Goldfinger | |
| 6,566,484 | B1 | | 5/2003 | Gharda et al. | |

FOREIGN PATENT DOCUMENTS

| EP | 0 895 991 | 2/1999 |
|---|---|---|
| GB | 2355464 | 4/2001 |

OTHER PUBLICATIONS

Abdou et al., "Condensation of α-Hydroxy Ketones with Phosphorus Ylides: A Convenient Synthesis of Linear Heterocyclic Formation," Heteroatom Chemistry, 10:481-487 (1999).
Anstead and Katzenellenbogen, "Optimizing of 2,3-Diarylindenes as Fluorescent Estrogens: Variation of the Acceptor Group, Ortho Substitution of the 2-Ring, and C-1 Methylation," J. Med. Chem., 31:1754-1761 (1988).
Dormer, et al., "Highly Regioselective Friedländer Annulations with Unmodified Ketones Employing Novel Amine Catalysts: Synthesis of 2-Substituted Quinolines, 1,8-Napthyridines, and Related Heterocycles," J. Org. Chem., 68:467-477 (2003).
Gano et al., "Synthesis of twist-twist π-conjugated Di-sec-alkylstilbenes and stilbene polymers." J.Org.Chem., 68:3710-3713, 2003.

Jeong, et al., "Preparation of x- or β-Trifluoromethylated Vinylstannanes and Their Cross-Coupling Reactions," Journal of Fluorine Chemistry, 120:195-209 (2003).
Kobayashi and Akiyama, "Renaissance of Immobilized Catalysts. New Types of Polymer-Supported Catalysts, 'Microencapsulated Catalysts', Which Enable Environmentally Benign and Powerful High-Throughput Organic Synthesis," Chem. Commun. 449-460 (2003).
Kron et al., "Diethlstilbestrol-linked cytotoxic agents: Synthesis and binding affinity for estrogen receptors." J. Med.Chem. 32:1532-1538, 1989.
Li, et al., "Synthesis and Characterization of Hyperbranched Aromatic Poly(ether imide)s," Macromolecules, 36:5537-5544 (2003).
Lubczyk et al., "Antiestrogenically active 1,1,2-Tris(4-hydroxyphenyl)alkenes without basic side chain: Synthesis and biological activity." J.Med.Chem. 46:148-1491, 2003.
Lubczyk et al., "Investigations on estrogen receptor binding: The estrogenic, antiestrogenic, and cytotoxic properties of C2-alkyl-substituted 1,1-bis(4-hydroxyphenyl)-2-phenylethenes." J.Med.Chem. 45:5358-5364, 2002.
Middleton and Bingham, "α-Fluorination of Carbonyl Compounds with $CF_3OF$," J. Am. Chem. Soc., 102:4845-4846 (1980).
Meegan, et al., "Flexible Estrogen Receptor Modulators: Design, Synthesis, and Antagonistic Effects in Human MCF-7 Breast Cancer Cells," J. Med. Chem., 44:1072-1084 (2001).
Moreno, et al., "A Simple Route to New Phenanthro- and Phenanthroid-Fused Thiazoles by a PIFA-Mediated (Hetero) biaryl Coupling Reaction," Eur. J. Org. Chem., 2126-2135 (2002).
Mosnacek, et al., "Preparation of 4-Vinylbenzil and Photochemical Properties of Its Homopolymer and Copolymer with Styrene," Macromolecules, 37:1304-1311 (2004).
Ogata, et al., "Synthesis and Oral Antifungal Activity of Novel Azolylpropanolones and Related Compounds," J. Med. Chem., 30:1054-1068 (1987).

(Continued)

*Primary Examiner*—Samuel Barts
*Assistant Examiner*—Sikarl A. Witherspoon
(74) *Attorney, Agent, or Firm*—Foley & Lardner LLP

(57) ABSTRACT

Disclosed are processes for preparing modifiable poly (aralkyl ketone)s having active methylene group(s) in the main chain comprising reacting an aralkanoic acid or mixtures thereof in the presence of one alkane or aryl sulfonic acid and a condensing agent. Also disclosed are novel modifiable poly(aralkyl ketone)s obtainable by the processes of the inventions.

41 Claims, 4 Drawing Sheets

OTHER PUBLICATIONS

Patteux, et al., "A Novel Traceless Solid-Phase Friedländer Synthesis," Organic Letters, 5, 17:3061-3063 (2003).

Prakash, et al., "Alkoxide- and Hydroxide-Induced Nucleophilic Trifluoromethylation Using Trifluoromethyl Sulfone or Sulfoxide," Orgainic Letters, 5,18:3253-3256 (2003).

Qin, et al., "Design and Synthesis of a Thermally Stable Second-Order Nonlinear Optical Chromophore and Its Poled Polymers," Journal of Polymer Science: Part A: Polymer Chemistry, 41:2846-2853 (2003).

Ranu and Dey, "An Efficient Synthesis of Pyrroles by a One-Pot, Three-Component Condensation of a Carbonyl Compound, an Amine and a Nitroalkene in a Molten Ammonium Salt," Tetrahedron Letters, 44:2865-2868 (2003).

Reddy, et al., "Cleavage of Nonphenolic β-1 Diarylpropane Lignin Model Dimers by Manganese Peroxidase from *Phanerochaete chrysosporium*,"Eur. J. Biochem., 270:284-292 (2003).

Santra and Sagar, "Dihydrogen Reduction of Nitroaromatics, Alkenes, Alkynes Using Pd(II) Complexes Both in Normal and High Pressure Conditions," Journal of Molecular Catalysis A: Chemical 197:37-50 (2003).

Sharma, et al., "Structure-Activity Relationship of Antiestrogens. Phenolic Analogues of 2,3-Diaryl-2H-1-benzopyrans," J. Med. Chem. 33:3222-3229 (1990).

Xu and Lu, "Selective Synthesis of Either Enantiomer of α-Amino Acids by Switching the Regiochemistry of the Tricyclic Iminolactones Prepared from a Single Chiral Source," J. Org. Chem., 68:658-661 (2003).

* cited by examiner

Aliphatic poly(ketone)s
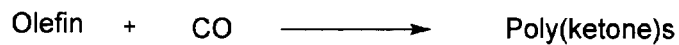
eg
Fig. 1
Fig. 2
Polymeric ketones - chemical structure
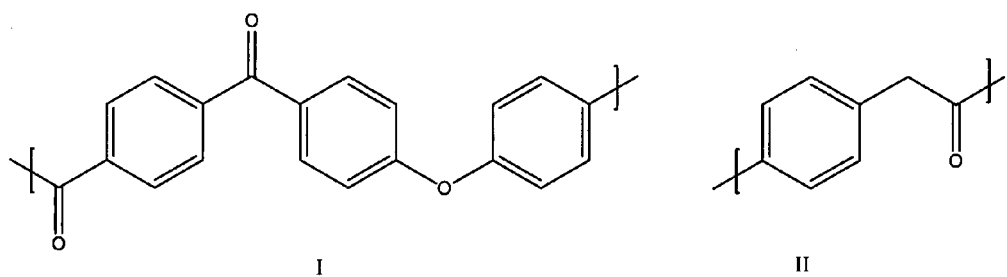
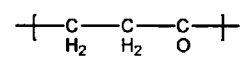
Fig. 2A Electrophilic substitution - acid chloride route Nucleophilic route Fig. 3
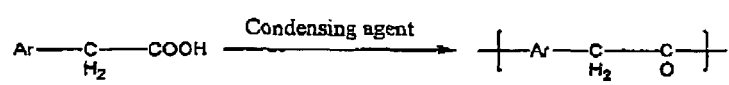
Fig. 3A
Fig. 3B
Fig. 4
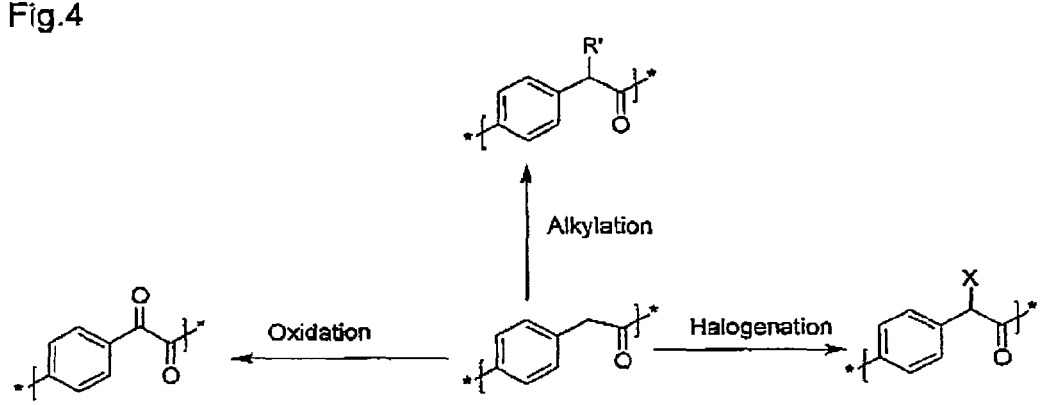
Scheme 1. Reactions involving the methylene group Scheme 2. Reactions involving the carbonyl group EW - electron withdrawing group
eg. Nitro group ED - electron donating group
eg. N,N-disubstitutedamino group Scheme 3. Reactions involving the carbonyl group and the methylene unit

POLY(ARALKYL KETONE)S AND METHODS OF PREPARING THE SAME

The invention relates to novel modifiable poly(aralkyl ketone)s and processes for their preparation.

BACKGROUND OF THE INVENTION

Polymers containing keto-groups are in general high performance engineering thermoplastics, often having the advantages of chemical resistance, good high temperature properties, good tensile properties and others. They are commercially significant because of their good mechanical properties and thermooxidative stability. There are two broad classes of keto group containing polymers, namely aliphatic polyketones and aromatic poly(ether ketone)s (cf. FIGS. 1 and 2).

Aliphatic polyketones are prepared by the co-polymerization of olefin(s) and carbon monoxide (see FIG. 1). In this case the co-polymerization may proceed, for example, free radically or as catalyzed by Palladium metal by "insertion" polymerization.

Aromatic poly(ether ketone)s are obtained by electrophilic Friedel-Crafts acylation polymerization (cf. FIG. 2B) or by aromatic nucleophilic substitution (cf. FIG. 2C). The nucleophilic route typically employs a metal salt of a difunctional phenolic compound and a dihalobenzophenone along with a base in high boiling dipolar aprotic solvents or sulfolane at high temperatures.

There are a few drawbacks associated with this process. The halo benzophenone monomers employed in the polymerization are predominantly derived from fluorobenzophenone and these monomers are very expensive. Also these reactions produce by-products like inorganic fluorides which must be properly disposed of. In the electrophilic substitution route an acid halide of a difunctional carboxylic acid is complexed with aluminum trichloride which is then reacted with aromatic compounds activated for electrophilic substitution. Because of the fact that this reaction proceeds heterogeneously, the molecular weights of the polymers produced are generally undesirably low. Also, since excess aluminum trichloride has to be employed, which later must be separated from the polymer and as a result generates a lot of inorganic waste in the process. Furthermore, the acid halide employed is also highly moisture sensitive and the presence of traces of water can convert it back to the unreactive carboxylic acid which would create stoichiometric imbalance. As these are step growth polymerizations, any change in stoichiometry would ultimately result in unfavourable low molecular weight materials. An alternative process employs very highly corrosive acid mixtures like boron trifluoride-hydrofluoric acid.

Alternative condensing agents for making keto groups through aromatic electrophilic substitution are also available. For example, a system consisting of phosphorus pentoxide/methane sulfonic acid in a weight to volume ratio of 1:10 has been used as condensing agent in the preparation of poly(ketone)s. (cf. Ueda, M., et al., "Synthesis of aromatic poly(ether ketone)s in phosphorus pentoxide/methane sulfonic acid", Polymer Journal, Vol. 21, No. 9, pp 673–679 (1989); Ueda, M., et al., "Synthesis of polyketones by direct polycondensation of dicarboxylic acids with diaryl compounds using phosphorus pentoxide/methane sulfonic acid as condensing agent and solvent", Makromol. Chem., Rapid Commun. 5, pp 833–836 (1985); Ueda, M., et al., "Synthesis of aromatic poly(ether ketone)s", Macromolecules, 1987, 20, pp 2675–2678; Parthiban, A., et al., "Preparation and Characterization of co- and homo-poly(phenylene etherimide ketone)s", J. Polym. Sci.: Part A: Polym. Chem., Vol. 31, pp 1233–1241 (1993)). Many other modifications of this condensing agent are available.

For example U.S. Pat. No. 4,820,792 discloses the use of fluoroalkane sulfonic acid or methane sulfonic acid along with other acids like polyphosphoric acid, trichloroacetic acid and trifluoroacetic acid. There are several disadvantages associated with this process. Polyphosphoric acid is highly viscous and hence it is difficult to handle. The weaker acids also require the use of highly corrosive stronger acids and thus these acids would pose a lot of problems in terms of plant maintenance. Because of the reduced acidity of the condensing agent, a very long reaction time is required in order to get polymers with appreciable viscosities. In addition to these drawbacks, the process is cumbersome as it involves various heating stages which contributes to higher energy costs and the formation of undesired structures. Also the use of halogenated sulfonic acids like trifluoromethane sulfonic acid or trifluoroacetic acid is not economically advantageous.

U.S. Pat. No. 5,155,203 discloses the preparation of poly(ether ketone) using phosphorus pentoxide/methane sulfonic acid as condensing agents. However, it is a co-polymer made up of two different difunctional monomers namely 1,3-bis(4-phenoxy benzoyl) benzene and 4,4'-oxydibenzoic acid. The carboxylic acid employed is aromatic in nature. As a result, diary ketone is formed which, however, is unsuitable for further organic reactions.

UK patent application No. GB 2,355,464 discloses the preparation of poly(ether ketone)s using alkyl or aryl sulfonic acids with the absence of phosphorus pentoxide so that no neutralisation step is required after the polycondensation reaction. In place of phosphorus pentoxide higher temperatures are employed. The water formed as a result of polycondensation is removed either by passing inert gas like nitrogen into the reaction mixture which drives off the water in the form of its vapour or by removing water as an azeotrope with solvents like xylene or toluene. One of the drawbacks of this process is that the solvents toluene or xylene used for forming the azeotrope can act as end capping agents and cause premature termination of the growing polymer chain. A second drawback is that aromatic carboxylic acids are employed and hence the process results in the formation of diary ketones which is not useful for further modification of the polymer structure. Also higher temperatures will induce the formation of undesired structures.

U.S. Pat. No. 6,538,098 discloses a process for the polymerization of dicarboxylic acid with an electron rich bi-reactive compound using a combination of phosphoric acid and trifluoroacetic anhydride. Again aromatic dicarboxylic acids are employed yielding diaryl ketones which are unsuitable for further modifications. Also the use of trifluoro acetic anhydride would make this process uneconomical.

U.S. Pat. No. 6,566,484 B2 discloses the preparation of melt processible poly(ether ether ketone) (PEEK) from phenoxy phenoxy benzoic acid using methane sulfonic acid containing methane sulfonic anhydride or phosphorus pentoxide. Yet again this process generates unmodifiable diaryl ketones, too.

All above-mentioned processes lead to unfunctionalized polymeric diaryl ketones which are difficult to modify. However, modification of these polymers is necessary in order to improve some or many of the properties of the base polymer. In general, there are two ways to functionalize polymers. One is the use of a functionalized co-monomer during the co-polymerization. For example, Parthiban et al. ("Amino-functionalised poly(arylene ether ketone)s", Macromolecules, 1997, Vol. 30, pp 2238–2243), have reported the preparation of amine functionalized polyarylene ether ketones using this approach. The disadvantage of this approach is that the functionalized monomers, in a majority of cases, are not readily available and hence the applicability of this approach is very limited.

The second route involves a modification reaction on the preformed polymer. This approach has many setbacks. The type of reactions that can be carried out on the preformed polymer is very limited. Also the functionalization is difficult to control in such cases. Since there are many reactive sites even within the repeating unit, most often these reactions are non-uniform.

U.S. Pat. No. 5,288,834 discloses the preparation of functionalized polyarylene ether ketones through the aromatic nucleophilic substitution route. Methyl group substituted hydroquinone has been used as co-monomer. In the subsequent steps the methyl group was activated by brominating the methyl group to yield various derivatives of polyarylene ether ketones. The disadvantages discussed above for the nucleophilic substitution are also applicable for this process. In addition the use of substituted bifunctional phenolic compounds make the process even more uneconomical.

U.S. Pat. Nos. 5,344,914 and 5,442,029 disclose the preparation of various poly(ketone)s via the nucleophilic substitution method. In this process aminonitriles are employed as nucleophiles. There are many drawbacks associated with this process. The preparation of the nucleophilic agents aminonitriles is an unsafe process. It involves the conversion of aldehydes into aminonitriles by reacting the aldehyde with a secondary amine and sodium cyanide. It is well known in the art that sodium cyanide is a highly poisonous compound and the use of it in equimolar quantities would make the process extremely unsafe. The generation of anion, needed for nucleophilic attack, also requires bases like sodium hydride which is pyrophoric in nature and hence has to be handled with extreme care. The process is highly unfavourable in terms of atom efficiency as well. For example the generation of each oxygen atom (atomic weight=16) is accompanied by the loss of much larger units like secondary amine and cyano groups. After acid hydrolysis the presence of cyanide ion even in traces causes a lot of problems for waste treatment and disposal. In addition the use of costly fluorobenzophenones in the preparation of poly(aryl ketone)s increases the cost of the overall process.

All the abovementioned processes result in difficult to modify diaryl ketones and are cited herein only as reference and are not admitted to be prior art.

Thus it is clear from the foregoing examples that the polymers as well as the respective synthetic techniques, which are employed currently, are limited in scope and applicability. Hence it would be desirable to develop a process leading to novel polymeric ketones which are functionalized in themselves, i.e. backbone functionalized, thereby aiding further modifications resulting in various derivatives which are industrially important, novel materials.

SUMMARY OF THE INVENTION

In one aspect, the invention thus provides a process for preparing modifiable poly(aralkyl ketone)s having active methylene group(s) in the main chain comprising reacting at least one aralkanoic acid in the presence of a suitable acid and a condensing agent.

In another aspect, the invention thus provides a process for preparing modifiable poly(aralkyl ketone)s having active methylene group(s) in the main chain, wherein this process comprises reacting an aralkanoic acid or mixtures thereof in the presence of an alkane or aryl sulfonic acid and a condensing agent.

In a further aspect, the invention thus provides a process for preparing modifiable poly(aralkyl ketone)s having active methylene group(s) in the main chain, wherein the process comprises reacting an acid halide of at least one aralkanoic acid in the presence of a Lewis acid catalyst and a solvent.

Accordingly, in yet a further aspect, the invention provides modifiable poly(aralkyl ketone)s which are obtainable, for example, by the two above-mentioned processes which either comprises reacting an aralkanoic acid or mixtures thereof in the presence of one alkane or aryl sulfonic acid and a condensing agent or which comprises reacting an acid halide of the at least one aralkanoic acid in the presence of a Lewis acid catalyst and a solvent.

BRIEF DESCRIPTION OF THE DRAWINGS

FIG. 1 shows the general structure of aliphatic polyketones and the known preparation of aliphatic polyketones by co-polymerization of olefin(s) and carbon monoxide;

FIG. 3 shows the general chemical structure of the polymeric poly(aralkyl ketone)s of the invention (FIG. 3A) which is further illustrated by the general structure of a polyaralkyl ketone which is obtained from phenylacetic acid (FIG. 3B). FIG. 3 also shows an exemplary preparation for a polymer according to one embodiment of a process of the present invention;

FIG. 4 shows an exemplary scheme for possible conversions of the inventive poly(aralkyl ketone)s concerning reactions on the methylene group;

DETAILED DESCRIPTION OF THE INVENTION

Figure 2B:
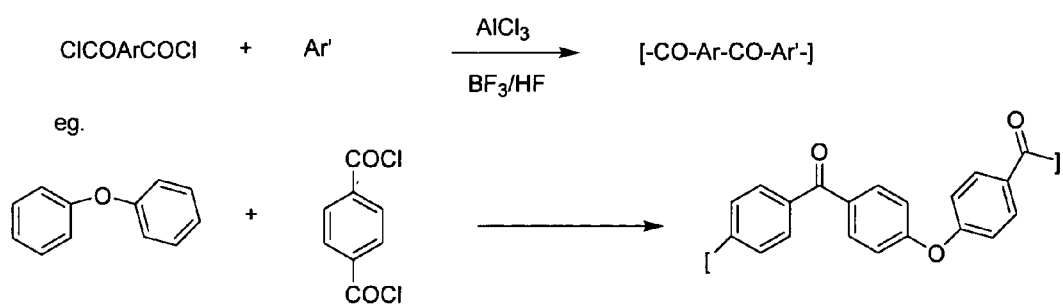
FIG. 2 shows the general structure of aromatic poly(ether ketone)s (FIG. 2A) and known preparation of aromatic poly(ether ketone)s by electrophilic Friedel-Crafts acylation polymerization (FIG. 2B) and by aromatic nucleophilic substitution (FIG. 2C)
Figure 2C:
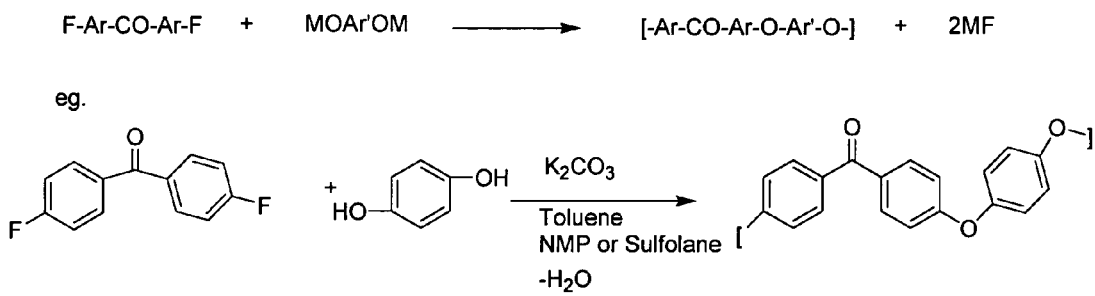

Step growth polymerization, also known as condensation polymerization occurs when in the same monomer, i.e. the same molecule, two different reacting moieties are present or, when in two different molecules, which are the monomers the different reacting moieties are present. If the two different reacting groups are present in the same molecule, then the monomer is designated as AB type and the polymerization is called a homo-polymerization. If the two different reacting groups are present in two different monomers, the monomers are designated as AA, i.e. a molecule carrying similar functional groups of one type and BB, i.e. a molecule carrying similar functional groups of a second type and the polymerization is termed as co-polymerization. Homo- or self polymerizable monomers are favourable in general since stoichiometric imbalance which often leads to the premature termination of polymerization, does not arise in these types of monomers as only one compound is used as polymerizable compound.

Aralkanoic acids are AB type monomers capable of undergoing homo- or self polymerization. In the present invention, it has been discovered for the first time, that aralkanoic acids of the AB type can be used to easily and elegantly prepare highly versatile and modifiable polymers. In one embodiment, the process of the present invention involves the polymerization of polymerizable aralkanoic acids in alkane or aryl sulfonic acid with a condensing agent.

In a first aspect, the present invention is thus directed to a process for preparing modifiable poly(aralkyl ketone)s having active methylene group(s) in the main chain comprising reacting an aralkanoic acid or mixtures thereof in the presence of one alkane or aryl sulfonic acid and a condensing agent.

In one preferred embodiment one aralkanoic acid is being self-reacted to form the modifiable poly(aralkyl ketone)s having active methylene group(s) in the main chain. By self-reacting the aralkanoic acid is meant that one of the two reacting groups present in the aralkanoic acid reacts with the second type of reacting groups present on a second molecule of the same type to form a dimer having again two different reacting groups in the molecular unit. The further polymerization proceeds according to this reaction path.

According to another preferred embodiment of the present invention two or more different aralkanoic acids can be copolymerised to form a copolymeric compound.

In a further aspect of the invention, the aralkanoic acids are compounds according to the formula (I)

$$Ar_m—(CX_2)_n—COOH \quad (I),$$

wherein m is an integer from 1 to 6 and n is 1 or 2; $Ar_m$ is an aromatic moiety; and
X is selected from a group of substituents so that the group —$(CX_2)_n$— is an electron donating group providing electron density to the aromatic ring.

According to the present invention $Ar_m$ can be any suitable aromatic moiety. This aromatic moiety can for example be, but is not limited to, an optionally substituted benzenoid aromatic compound, an optionally substituted non-benzenoid aromatic compound or an optionally substituted heterocyclic aromatic compound.

By a benzenoid aromatic compound in the present invention is meant a cyclic aromatic compound containing one or more benzene rings. If more than one benzene ring is present in the molecule those benzene rings can be fused, connected directly by a covalent bond or connected through a bridge containing one or more —$CH_2$— groups. One or more of the —$CH_2$— groups of the connecting bridge can be substituted by one or more hetero atoms. The hetero atom can be selected from the group of N, S and O. In some embodiments the bridge is —$CH_2$—, —O— or —O—$CH_2$—O—.

A non-benzenoid aromatic compound according to the present invention is a cyclic aromatic compound having no benzene rings (i.e. 6 membered aromatic ring) in the molecule. Examples for such compounds are azulenes (which consist of a seven membered ring fused to a five membered ring), annulenes such as [14]-annulenes, [18]-annulenes, bridged [10]-annulenes and the like.

Heterocyclic aromatic compounds according to the present invention are cyclic aromatic compounds wherein at least one carbon atom of the cyclic system is being replaced by a hetero atom. Such heteroatoms can be N, S or O. Examples of such heterocyclic aromatic compounds are pyrazole, imidazole, pyridine, quinoline, acridine, pyridazine, pyrimidine, phenazine, furan, thiophene, oxazole, and the like.

In one presently preferred embodiment $Ar_m$ is selected from the group consisting of

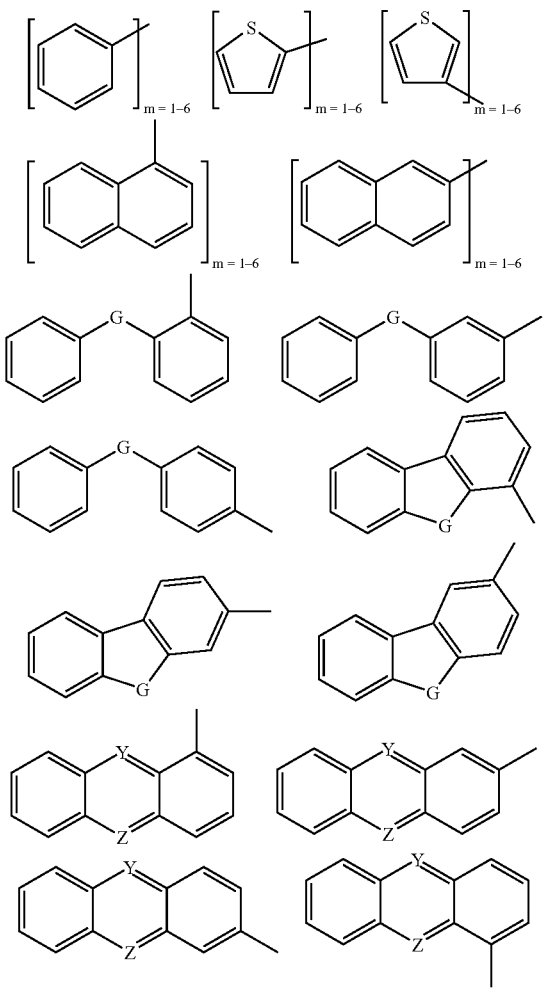

wherein G is selected from the group consisting of —$CH_2$—, O, S or NH; and Y and Z are independently selected from the group consisting of —$CH_2$—, —CH—O, S, and N, and wherein each of the aromatic rings can be optionally substituted. In this respect, it is noted that both (oligomeric) $Ar_m$ residues wherein m is greater than 1, and $Ar_m$ monomers carrying groups G, Y and Z, possess more than one aromatic group capable of undergoing electrophilic substitution. See for example, when Y and Z are both a $CH_2$-group, the $Ar_m$ residue has a generic structure such as

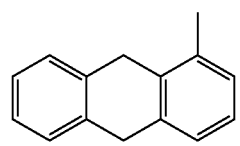

or

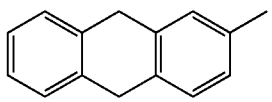

Such molecules having more than one aromatic ring that is available for electrophilic substitution can be designated as AB2 type and yield non-linear branched polymers upon polymerisation. These types of non-linear polymers are commonly termed as hyperbranched polymers in the art.

The index m can adopt any number between 1 and 6 and accordingly indicates that the number of repeating aromatic moieties that are present in the aromatic compounds $Ar_m$. In this connection, it should be noted that in case 2 or more moieties are present, i.e. an oligomeric aromatic compound $Ar_m$ is employed in the invention, the oligomer can be a homo- or a heteropolymeric compound. The different aromatic moieties can be present in succession as well as in alternating arrangement. An example of such a heteropolymeric unit $Ar_m$ is a moiety one with alternating phenyl (Ph) and naphthyl (Np) residues which has the structure Ph—Np—Ph—Np—. Another example for an alternating arrangement is the residue Ph—Th—Ph—Th, if phenyl and thiophenyl are used as building blocks for $Ar_m$, which can be present in an aralkanoic acid such as Ph—Th—Ph—Th—$CH_2$—COOH or Ph—Th—Ph—Th—$CH_2$—$CH_2$—COOH. An example of a moiety Arm, wherein the aromatic building blocks are in succession is Ph—Ph—Th—Th or An—An—Ph—Ph, if anthracene (An) and phenyl are used.

The aromatic compounds $Ar_m$ of formula (I) can also be optionally substituted, i.e. one or more hydrogen atoms of the aromatic ring(s) can be replaced by other groups. Such other groups may be present on the aromatic ring as long as these groups do not interfere with the ketone forming polymerization reaction but having a positive influence on the reaction process. Without wishing to be bound by theory, it is believed that in terms of reaction mechanism the processes according to the present invention proceed by electrophilic attack on the aromatic ring of the aralkanoic acids. It is well known in the art that in aromatic electrophilic substitution reactions, the aromatic ring would be more reactive if its electron density is increased. Electron donating substituents attached to the aromatic rings would make these rings more electron rich and thus make them more reactive. Such substituents are generally termed as +I (inductively positive), +M (mesomeric) or +R (resonance) groups. Preferred electron donating substituents can be selected, but are not limited to, from ethers, alkyl, suitably substituted aryl and amino groups. Examples of presently preferred electron donating substituents are —OR, —OH, —$CH_3$, —$C_2H_5$, —$C_3H_7$, —$NR_2$, —NHR, —$NH_2$ or —NHCOR. R is typically an alkyl carbon chain with 1 to 6 main chain carbon atoms and can be branched or straight chained. Examples of the substituent R include methyl, ethyl, propyl, isopropyl, and butyl, tertiary butyl, pentyl, isopentyl, hexyl and isomers thereof. Examples of such substituted aralkonic acids include 2-aminophenyl acetic acid, 3-aminophenyl acetic acid, 2-anilinophenyl acetic acid, 2-hydroxyphenyl acetic acid, 3-hydroxyphenyl acetic acid, 2-methoxyphenyl acetic acid, 3-methoxyphenyl acetic acid, 2,5-dihydroxyphenyl acetic acid, 2-aminophenyl propionic acid, 2,5-bis (trifluoromethyl) phenyl acetic acid, 3-aminophenyl propionic acid, 2-anilinophenyl propionic acid, 2-hydroxyphenyl propionic acid, 3-hydroxyphenyl proponic acid, 2-methoxyphenyl propionic acid or 3-methoxyphenyl propionic acid to new a few out of the numerous suitable acids. If free amino and hydroxyl groups are present as substituents in aralkanoic acids, these groups may suitably be protected before being subjected to polymerization. Suitable protective groups and respective reaction conditions are known to the person skilled in the art.

Groups like nitro, cyano, sulfonyl, haloalkyl and carbonyl are some of the groups which make the aromatic ring electron deficient and hence unreactive for the aromatic electrophilic substitution, as these groups are classified as –I (inductively negative), –M (mesomeric) or –R (resonance). In spite of their electron withdrawing nature these groups, however, can be presented on the aromatic ring or as substituents of other alkyl, aryl or amine groups which are present as substituents on the aromatic ring as long as the overall effect of all substituents is an electron donating effect and therefore support the polymerization reaction of the present invention.

In some embodiments of the invention, m in formula (I) is an integer from 1 to 6. In these embodiments m is presently preferred to be an integer from 1 to 4 and most presently preferred is 1 or 2.

X in formula (I) can be any suitable substituent that ensures that the group —$(CX_2)_n$— is an (or acts as an) electron donating group providing electron density to the aromatic ring or system. Thus, any group belonging to either of the +I, +M or +R category can be X, provided the group concerned does not interfere with the polymerization. X can for example be independently selected from the group consisting of —H, alkyl, alkoxyl, suitably substituted aryls or amines. In some embodiment each of the two substituents X can be independently selected from —H, —$CH_3$, —$C_2H_5$, —$C_3H_7$, —$NH_2$, —NHR, —$NR_2$, —OH or —OR, wherein R is typically an alkyl carbon chain with 1 to 6 main chain carbon atom and can be branched or straight chained. Examples of the suitable residues R include methyl, ethyl, propyl, isopropyl, and butyl, tertiary butyl, pentyl, isopentyl, hexyl and isomers thereof. R is selected from methyl, ethyl, propyl or butyl and isomers thereof. In one presently preferred embodiment, at least one or both of the substituents X is —H. Specific examples of aralkanoic acid with a substituted group X include, but are not limited to, 2-isopropyl-2-phenyl acetic acid, benzoyl (phenyl) acetic acid, 2-phenylglycine, phthaloyl-2-phenylglycine, 2-phenyl butanoic acid, 3-phenyl butanoic acid, phenyl alanine, α-amino-2-thiophene acetic acid or α-amino-3-thiophene acetic acid. The skilled man appreciates that numerous derivatives of such aralkanoic acids can easily be made. For example, the amino group of 2-phenyl glycine, phenyl alanine or α-amino-2-thiophene acetic acid can be reacted with any suitable modifying reagent such as an alkylating agent or a compound having an activated carbonyl group leading to formation of an amide linkage (cf. Examples 6 and 7).

Groups exhibiting –I, –M or –R nature such as the halogens F, Cl, Br, I, or —$NO_2$, —CN, $CF_3$, CO or the like, though not preferable, may also be present as X (cf. Example 7, wherein a phthaloyl-substituent with two CO groups is attached to α-carbon atom of the aralkonic acid through a nitrogen atom). This is because the deactivating effect of these groups when they are present as X is far lower than when attached directly to the aromatic ring of the aralkonic acid. In deed, the carbon atom C of the group $CX_2$ would act as a shield and thereby minimise their deactivating effect. Another important factor is that the effect of these groups on the stability of the intermediate species, namely the acylium ion, that is formed in the process of the present invention. Thus, quite apart from the mild deactivating effect, the influence of these groups on the stability of the acylium ion would may even be advantageous for the polymerisation reaction. Accordingly, aralkanoic acids such as 2-chloro-2-phenyl acetic acid or 2-triflouromethyl-2-phenyl acetic acid could also be used in the invention. In addition and as already noted above, these groups may be present in a monomer used as they can be attached through other groups which increase the electron density of the aromatic ring, so that the overall density of the aromatic ring is increased.

n in formula (I) is either 1 or 2. n>2 would induce intramolecular cyclization to yield cyclic ketones which would render the molecule unsuitable for polymerization. These unwanted cyclizing side reactions, even if they would occur to a small extent, would ultimately reduce the overall yield of the polymer and also would make the polymer impure thereby demanding additional purification steps.

In some embodiments of the invention, the aralkanoic acid is phenyl acetic acid, phenyl propionic acid, thiophene-2-acetic acid, thiophene-3-acetic acid, biphenyl-2-acetic acid, biphenyl-3-acetic acid, biphenyl-4-acetic acid, bithiophene-2-acetic acid, bithiophene-3-acetic acid, terthiophene-2'-acetic acid, or terthiophene-3'-acetic acid, wherein the aromatic group Ar of this acids may optionally be substituted. Examples of such substituted aralkonic acids include the above mentioned 2-aminophenyl acetic acid, 3-aminophenyl acetic acid, 215 anilinophenyl acetic acid, 2-hydroxyphenyl acetic acid, 3-hydroxyphenyl acetic acid, 2-methoxyphenyl acetic acid, 3-methoxyphenyl acetic acid, 2,5-dihydroxyphenyl acetic acid, 2-aminophenyl propionic acid, 2,5-bis (trifluoromethyl) phenyl acetic acid, 3-aminophenyl propionic acid, 2-anilinophenyl propionic acid, 2-hydroxyphenyl propionic acid, 3-hydroxyphenyl proponic acid, 2-methoxyphenyl propionic acid or 3-methoxyphenyl propionic acid.

The sulfonic acid used in the process of the invention can be any suitable alkane sulfonic acid or a mixture thereof for example, but not limited to a C1–C6 alkane sulfonic acid or a C1–C4 alkane sulfonic acid. The sulfonic acid can be optionally substituted. Examples of such substituted alkane sulfonic acides include trifluoromethane sulfonic acid or 2-chloroethane sulfonic acid. In one presently preferred embodiment of the invention, the alkane sulfonic acid is methane sulfonic acid. Alternatively, the sulfonic acid used in the process of the invention can be any suitable aryl sulfonic acid, for example a C6–C12 aryl sulfonic acid. In some presently preferred embodiments a C6–C9 aryl sulfonic acid is used. In another presently preferred embodiment of the present invention, the aryl sulfonic acid is benzene sulfonic acid. Which kind of sulfonic acid is used in the preparation of the polymer depends on the monomer, i.e. the aralkanoic acid, and the reaction conditions. The alkane or aryl sulfonic acid may be suitably separated from the reaction mixture before or preferably after the work-up of the polymerization reaction mixture and recycled so that it can be reused again. Other acids having an acidity comparable to that of the sulfonic acids can be also used within the scope of the present invention as long as they do not interfere with the polymerisation and for example, if the process of the invention is scaled up, may be more economical when compared to other acids, e.g. halogenated sulfonic acids. Examples of such other non sulfonic acids include trifluoro acetic acid, trichloro acetic acid, dichloro acetic acid or mixtures thereof to name a few of them.

Another possibility for preparing the modifiable poly (aralkyl ketone)s having active methylene group(s) of the invention is the use of an acid halide of the aralkanoic acid in the presence of a suitable Lewis acid catalyst. Accordingly, the present invention is also directed to a process for preparing modifiable poly(aralkyl ketone)s having active methylene group(s) in the main chain comprising reacting the acid halide of at least one aralkanoic acid in the presence of a Lewis acid catalyst and a solvent.

In this aspect of the invention any suitable acid halide can principally be used. In one embodiment, the acid chloride of the aralkanoic acid is used. Examples of suitable Lewis acid catalysts include aluminium chloride, boron trifluoride, ferric chloride (Iron III chloride), or triflates of some metals (typically rare earth metals) like scandium. Boron trifluoride is typically used in form of a suitable complex such as boron trifluoride-acetic acid, boron trifluoride-diethyl ether, boron trifluoride-dimethyl ether, boron trifluoride-phenol and the like. The catalyst is typically used in a molar ratio of 1:2 to preferably 1:1.5 (acid halide:catalyst ratio) with respect to the aralkanoic acid halide.

In one embodiment of this aspect, the aralkanoic acid is a compound of the formula (II)

$$\text{Ar}_m\text{—}(\text{CX}_2)_n\text{—COHal} \qquad (II),$$

wherein m is an integer from 1 to 6 and n is 1 or 2;

Hal is chloride, bromide, fluoride or iodide;

$\text{Ar}_m$ is an aromatic moiety; and

X is selected from a group of substituents so that the group —$(\text{CX}_2)_n$— is an electron donating group providing electron density to the aromatic ring.

In a further aspect of the invention, a condensing agent is used to remove the water produced during the reaction in the process of the invention that comprises reacting at least one aralkanoic acid in the presence of a suitable acid such as a sulfonic acid or an acid with an acidity comparable to that of a sulfonic acid. The condensing agent used in this inventive process may be employed along with the alkane or aryl sulfonic acid for the polymerization of aralkanoic acids. In principle, any condensing agent that is compatible with the aromatic compounds $\text{Ar}_m$ can be used in the present invention. Examples of suitable condensing agents include, but are not limited to, phosphorus pentoxide, thionyl chloride, methane sulfonic anhydride and mixtures thereof. In a presently preferred embodiment of the invention the condensing agent is phosphorus pentoxide.

In principle, any molar ratio of the condensing agent and the aralkanoic acid can be used in the inventive process. Typically, this molar ratio may vary between 4 mol condensing agent: 1 mol aralkanoic acid, preferably between 2:1, more preferably between 1.5:1 and most preferably between 1:1. The ratio of the condensing agent and the alkane or aryl sulfonic acid may typically vary between 1 g condensing agent:10 ml sulfonic acid, preferably between 1 g:5 ml, more preferably between 1 g:4 ml and most preferably between 1 g:3 ml.

Likewise, any suitable ratio between the aralkanoic acid as the reactant and the selected sulfonic agent can be employed in this aspect of the invention. The ratio of the aralkanoic acid and the alkane or aryl sulfonic acid may typically vary from 1 g:10 ml, preferably from 1 g:5 ml, more preferably from 1 g:4 ml and most preferably from 1 g:3 ml. The total amount of the alkane or aryl sulfonic acid used in the process of the invention may be independent of each of the above-mentioned ratios. The maximum amount to be used depends on the respective reaction compounds and conditions.

The processes according to the present invention are advantageously carried out in anhydrous conditions but can be carried out under different conditions, too. For example, to avoid unwanted side reactions by atmospheric moisture, it is convenient to run the reaction under an inert atmosphere such as nitrogen or argon, preferably under nitrogen. The process may proceed under agitation, preferably with a magnetic stirrer or a mechanical stirrer. Other reaction conditions, such as temperature and pressure, depend upon the components employed in the reaction and can readily be determined by experiment.

Generally, the reaction can be carried out at temperatures ranging from about −20° C. to about 140° C. In presently preferred embodiments, the reaction takes place at temperatures from about −10° C. to about 130° C., more preferably at a temperature from about −5° C. to about 120° C. and most preferably from about 0° C. to about 100° C. or about 20° C. to about 90° C. In one presently preferred embodiment of the invention the reaction temperatures should be between about 70° C. to about 80° C.

Also, any suitable reaction can be chosen in the invention as long as poly(aralkyl ketone)s of the invention are obtained in a satisfying yield. In typical examples, the reaction time may vary from 5 minutes to 72 hours, preferably from 30 minutes to 48 hours, more preferably from 45 minutes to 30 hours and most preferably from 50 minutes to 24 hours.

The pressure at which the process of the invention is run is not critical. The process can be carried out at pressures above or below ambient pressure although the reaction normally is performed at ambient pressure.

The reagents used in the present invention may be added to the reaction mixtures in any order suitable for preparing the polymer. For example, the alkane or aryl sulfonic acid may be added to a mixture of the condensing agent and aralkanoic acid and vice versa. The aralkanoic acid may be added to a mixture of the condensing agent and alkane or aryl sulfonic acid and vice versa. The condensing agent may be added to a mixture of aralkanoic acid and alkane or aryl sulfonic acid and vice versa. From the above it is to be understood that the components may be added in any order provided the chosen order does not adversely affect the reaction.

Other solids or liquids may be added to the reaction medium so long as the added solid or liquid does not interfere with the polymerization. Such a liquid, which should be inert under the reaction conditions, may be a solvent for one or more of the used ingredients and/or the product polymer, but one or more of the ingredients may simply be suspended in the liquid. Suitable liquids can be alkanes like nitromethane, halogenated alkanes such as dichloromethane, chloroform, 1,2-dichloroethane or aromatic compounds such as nitrobenzene, or 1,2-dichlorobenzene. If the polymerisation of the aralkanoic acid in the form of its acid halide is carried out in the presence of a Lewis acid catalyst, solvents such as the alkanes, halogenated alkanes or aromatics are typically employed. Both processes of the invention may be run as a batch, semi-batch or continuous reaction in a reaction vessel well known in the art for such processes.

Other mono- or multi-functional molecules may also be present in small amounts if there is a need to modify a certain property of the polymer(s).

The prepared polymers according to the invention will typically have a molecular weight from 180 to 100.000, though a higher molecular weight may also be possible. It its however advantageous in some embodiments that no polymer above a molecular weight of 100.000 is prepared as such polymer may be insoluble and hence difficult to process or modify.

The poly(aralkyl ketone)s prepared according to the process of the present invention are main chain functional polymers in two aspects. First, they carry an active methylene group, and second they carry a carbonyl group in the main chain. Both of these groups can be easily modified in order to prepare a wide variety of novel materials (polymers) which also belong to the present invention and which are functional and industrially important with a wide variety of applications.

The reactions that lead to such novel poly(aralkyl ketone)s and that involve the methylene group can be selected from the group consisting of an alkylation which may be mono- or dialkylation of the methylene group, an arylation which may be mono- or diarylation of the methylene group, a halogenation (with F, Cl, Br, or I) which may be mono-dihalogenation of the methylene group and an oxidation of the methylene group. In presently preferred embodiments of alkylation or arylation, R' is a C1–C10 alkyl or aryl group which may be linear or branched, cyclic, and which may carry aromatic or heterocyclic units. Accordingly, the term "alkyl" also includes aralkyl. Thus, examples of alkyl groups R' include methyl, benzyl, ethyl, propyl, phenylpropyl, isopropyl, butyl, tertiary butyl, pentyl, isopentyl, hexyl, 2-ethyl hexyl, heptyl, octyl, nonyl decyl and isomers thereof. Examples of aryl groups R' include phenyl, xylyl, tolyl, mesityl or naphthyl. Examples of possible conversions involving the methylene group on the polymer can also be taken from Table 1 below or from FIG. 4.

Figure 5:
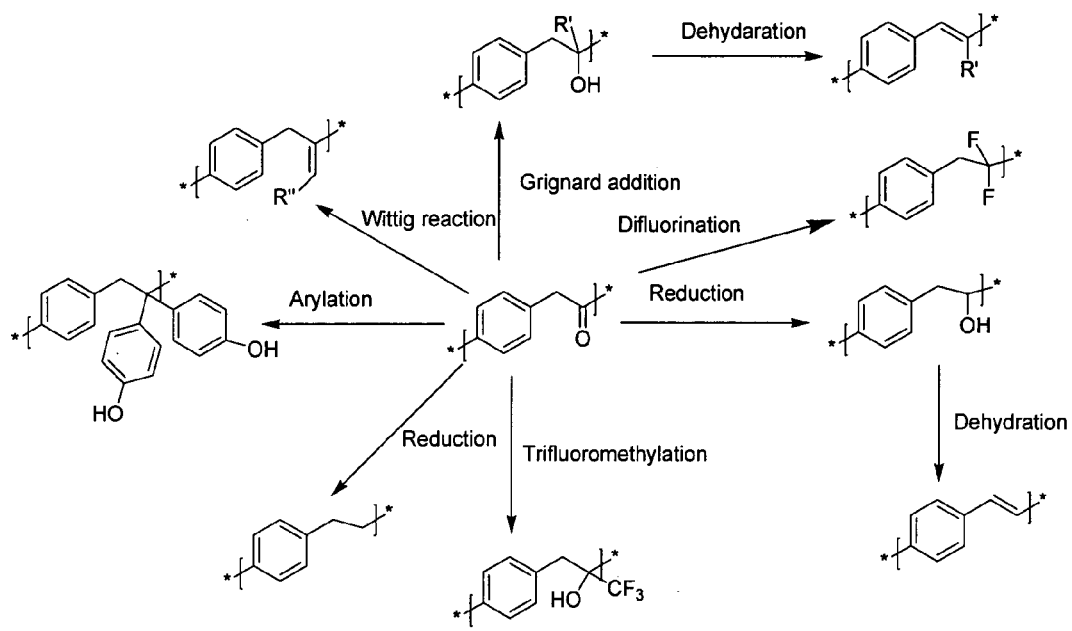
FIG. 5 shows a scheme for possible conversions of the inventive poly(aralkyl ketone)s concerning reactions on the carbonyl group.

The reactions involving the carbonyl group can be selected from the group consisting of a reduction of the carbonyl group to a methylene group, a reduction of the carbonyl group to secondary alcohol and a reduction of the carbonyl group to secondary alcohol followed by dehydration leading to poly(phenylene vinylene)s. Further, the modification reaction of the carbonyl group can be a Grignard addition involving alkyl magnesium halide to the carbonyl group leading to tertiary alcohol, a Grignard addition involving aryl magnesium halide to the carbonyl group leading to tertiary alcohol, a Grignard addition involving alkyl magnesium halide to the carbonyl group resulting in tertiary alcohol which upon subsequent dehydration yields poly(phenylene vinylene)s with alkyl substituents on the vinylene carbon or a Grignard addition involving aryl magnesium halide to the carbonyl group resulting in tertiary alcohol which upon subsequent dehydration yields poly (phenylene vinylene)s with aryl substituents on the vinylene carbon. The modification can also be trifluomethylation yielding the tertiary alcohol with a trifluoromethyl group or trifluoromethylation. The triflouromethylation reaction can be carried out with suitable reagents such as trifluoromethyl sulfone, trifluromethyl phenyl sulfone, trifluoromethyl phenyl sulfoxide, trifluoro phenyl methyl ketone or trifluoromethane. Optionally, the triflouromethylation reaction is followed by dehydration resulting in poly(phenylene vinylene)s carrying trifluoromethyl group on the vinylic carbon. In addition, the modification reaction can be difluorination of the carbonyl group yielding fluoro polymers. Further possible reactions involving the carbonyl group are arylation, trifluoromethylation, difluorination and Wittig reactions. Examples of possible conversions involving the carbonyl group of the polymer can be taken from Table 1 below or from FIG. 5.

Figure 6:
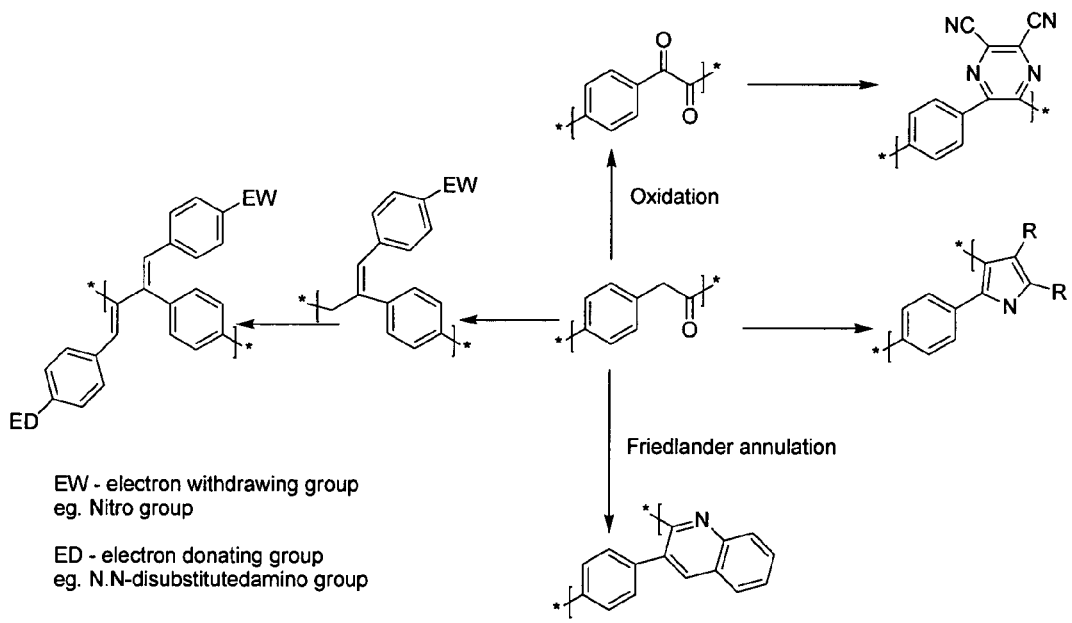
FIG. 6 shows a scheme for possible conversions of the inventive poly(aralkyl ketone)s concerning reactions on the carbonyl group and the methylene group.

In a further aspect of the present invention, reactions involving both methylene and carbonyl groups simultaneously or in a stepwise manner can also be carried out. Further modification reactions include reductive dehydration or oxidation, a Friedlander annulation reaction involving the reaction between poly(aralkyl ketone)s and aromatic alpha amino carbonyl compounds leading to polymeric nitrogen containing heterocycles or a reaction between poly(aralkyl ketone)s and alkynes in presence of Lewis acid catalysts leading to polymeric substituted naphthalene(s). The modifiable poly(aralkyl ketone)s according to present invention may be further modified by photoreaction(s) or thermal reaction(s). Examples of possible conversions involving the methylene and carbonyl groups on the polymer can be taken from Table 1 below or from FIG. 6. The reaction conditions for these reactions can easily been adapted from known analogous reactions which are described, for examples, in the references listed in Table 1.

TABLE 1

| S. No. | Reacting group of the polymer | Reaction type | Preferred reagent | Ref. |
|---|---|---|---|---|
| 1. | Methylene | Alkylation | Alkyl bromide, alkyl iodide, | 1 to 4 |
| 2. | Methylene | Fluorination | Trifluoromethyl hypofluorite | 5 |
| 3. | Methylene | Chlorination | Thionyl chloride | 6 |
| 4. | Methylene | Bromination | Bromine | 7 |
| 5. | Methylene | Oxidation | Selenium dioxide | 8 |
| 6. | Carbonyl | Reduction | Lithium aluminium hydride | 9 |
| 7. | Carbonyl | Reduction | Sodium borohydride | 10–11 |
| 8. | Carbonyl | Grignard addition followed by dehydration | Alkyl or aryl magnesium bromide (for addition) Phosphoric acid, p-Toluene sulfonic acid (for dehydration) | 12 |
| 9. | Carbonyl | Arylation | Phenol | 13 |
| 10. | Carbonyl | Trifluoromethylation | Trifluoromethylation reagent such as trifluoromethyl sulfone, trifluoromethyl phenyl sulfone, trifluormethyl phenyl sulfoxide, trifluoromethane or trifluoromethyl phenyl ketone | 14 |
| 11. | Carbonyl and Methylene | Formation of 1,2-diol: Oxidation of methylene followed by the reduction of dicarbonyl unit | Palladium (II) complex and hydrogen | 15 |
| 12. | Carbonyl and Methylene | Formation of heterocycle: Oxidation of methylene followed by the reaction of dicarbonyl compound | Diaminomaleonitrile | 16 |
| 13. | Carbonyl and Methylene | Friedlaendar annulation leading to quinolines and naphthyridines | Ortho amino aldehydes or ketones | 17–18 |
| 14. | Carbonyl and Methylene | Formation of heterocycle: Pyrrole | Amine and α,β-unsaturated nitroalkene | 19 |
| 15. | Carbonyl | Coupling | Ketone or aldehyde with $Ti^{III}$ or $Ti^{IV}$ chloride | 20 |
| 16. | Carbonyl | Wittig reaction | Phosphorus ylide | 21 |
| 17. | Methylene | Reaction with aldehyde or ketone to yield alkene (C=C bond) | Aldehyde or ketone | 22, 23 |
| 18. | Carbonyl | Reaction with a fluorinating agent | 2,2-Difluoro-1,3-dimethyl imidazolidine | 24 |

In addition, modification reaction(s) on the aromatic ring may also be carried out. In one embodiment of the invention the modification reaction on the aromatic ring is an aromatic electrophilic substitution reaction.

The above list of reactions is by no means exhaustive. The subsequent reactions following the polymerization of the monomers are in general high yielding and clean, i.e. no costly or expensive work up has to be carried out.

The materials thus obtained by employing any of these modification reactions are suitable in various industrial applications. For example, a polymeric hydroxyl group containing compound can be obtained according to the process of the present invention wherein the polymeric hydroxyl group containing compound is the aromatic equivalent of polyvinyl alcohol.

In a preferred embodiment, subjecting the polymer to a Grignard addition followed by dehydration as explained above will yield to compounds useful as organic light emitting diodes with substituents on the vinylene carbon. In principle, any suitable alkyl or aryl group can be introduced in a polymer of the invention by Grignard addition. In presently preferred embodiments an alkyl or aryl magnesium bromide compound R'—Mg—Br is used, wherein R' is C1–C10 alkyl or aryl group which may be linear or branched, cyclic, and which may carry aromatic or heterocyclic units. Accordingly, the term "alkyl" also includes aralkyl. Thus, examples of alkyl groups R' include methyl, benzyl, ethyl, propyl, phenylpropyl, isopropyl, butyl, tertiary butyl, pentyl, isopentyl, hexyl, 2-ethyl hexyl, heptyl, octyl, nonyl decyl and isomers thereof. Examples of aryl groups R' include phenyl, xylyl, tolyl, mesityl or naphthyl. All existing methods for the preparation of organic light emitting diodes involve substitution at the aromatic ring because of the ease of substituting the aromatic ring as compared to the vinylic carbons. Therefore, the present invention provides one of the rare approaches and extremely short routes which facilitates the substitution at the vinylic carbons. In this respect, a range of organic light emitting diode materials are contemplated to be obtained by the present invention, for example, but not limited to phenylene vinylene, thienylene vinylene, biphenylene vinylene etc. each having its own light emitting characteristics.

In addition, the polymers obtained by the process of the present invention can be used as photoresists. The photoactivity might arise from the benzylic and keto groups. The polymers of the present invention can be used as non-linear optical materials (NLO materials) for second harmonic generation main chain NLO polymers can be obtained by subsequent reactions. Further applications of the inventive polymers can be taken from Table 2 below.

TABLE 2

| Type of reaction | Expected product | Application area |
|---|---|---|
| Reduction of carbonyl group | Aromatic secondary alcohol (eqvt. to PVA with an aromatic ring) | Coating |
| Grignard followed by dehydration | Poly(phenylene) with substituents on the vinylic carbon | Organic light emitting diode (Electronics) |
| Trifluromethylation followed by dehydration | | |
| Reaction with o-amino benzaldehydes or ketones | Polymeric pyridine and naphthyridine type compounds | As catalysts |
| Inducing photoreaction | Crosslinked polymer | Photoresists (Microelectronics) |
| Disubstitution at methylene carbon | High Tg polymers | Gas separating membranes |
| Oxidation of methylene group | 1,2-Dicarbonyl compounds | Heterocyclic polymers |
| Two step reaction with p-nitrobenzaldehyde followed by Wittig reaction | Polymer with push-pull chromophore | NLO polymer (Electronics) |
| Halogenation of methylene group | Mono or dihalogenated polymers | Fire retardants |
| Difluorination of the carbonyl group | Fluoro polymers | Low dielectric materials |

The polymers prepared by means of the process including the modification reactions of the invention can be characterized by use of any conventional method such as GPC, NMR, IR, thermal analysis, analysis of mechanical properties etc.

The invention will be further illustrated with reference to the following non-limiting examples.

EXAMPLES

Example 1

Phosphorus pentoxide (10.42 g, 0.0367 mol) was dissolved with stirring in 50 ml of methane sulfonic acid by heating the mixture at 80° C. in a 250 ml RB flask fitted with a drying tube. After complete dissolution the mixture was cooled down to room temperature. Phenyl acetic acid (5 g, 0.0367 mol) was added and the stirring continued at room temperature. On the 3rd day of stirring at room temperature an aliquot was withdrawn and added to water. A clear solution was obtained. On the 4th day an aliquot was withdrawn from the reaction mixture and added to water. A precipitate was observed. The reaction was terminated by adding the reaction mass into 1000 ml water. The precipitate was filtered off, washed repeatedly with water until the filtered water showed neutral pH and dried. The dried solid was then dissolved in tetrahydrofuran (THF) and precipitated in hexane. The purified polymer was then dried in a vacuum oven maintained at 50° C. for two days. Yield 2 g (46%). GPC (Polystyrene standards; THF eluent): Number average molecular weight, Mn=2275; Weight average molecular weight, Mw=5550. IR (KBr) cm$^{-1}$: 3440(b), 3059(s), 3028(s), 1758(s), 1711(ss), 1600(ss), 1495(ss), 1444(s), 1412(w), 1370(w), 1332(w), 1223(ss), 1181(w), 1113(ss), 1028(w), 755(s), 699(ss) and 521(w).

Example 2

Phenyl acetic acid (10 g, 0.0734 mol) was added to a RB flask followed by phosphorus pentoxide (21 g, 0.0739 mol). The flask was fitted with a drying tube after adding 120 ml of methane sulfonic acid. The mixture was heated to 55° C. and held for 48 h. The flask was then cooled down to room temperature and the contents of the flask were poured into 2000 ml water. The solid obtained was filtered, washed repeatedly with hot water and then with water at ambient temperature until it showed neutral pH and then dried. After drying the polymer was dissolved in THF and precipitated in hexane. The precipitate was filtered and dried in a vacuum oven maintained at 50° C. for two days. Yield 5 g (57.63%). GPC (Polystyrene standards; THF eluent): Number average molecular weight, Mn=10829; Weight average molecular weight, Mw=43898. IR (KBr) cm$^{-1}$: 3449(b), 3058(s), 3028(s), 1758(s), 1708(w), 1677(s), 1630(s), 1601(s), 1495(ss), 1367(s), 1222(s), 1180(s), 1148(s), 1113(s), 757(s), 700(ss) and 521 (s).

Example 3

Phenyl acetic acid (10 g, 0.0734 mol) was added to a RB flask followed by phosphorus pentoxide (21 g, 0.0739 mol). The flask was fitted with a drying tube after adding 90 ml of methane sulfonic acid. The mixture was heated to 70° C. and held for 24 h. The flask was then cooled down to room temperature and the contents of the flask were poured into 2000 ml water. The solid obtained was filtered, washed repeatedly with hot water followed by water at ambient temperature until it showed neutral pH and then dried. After drying the polymer was dissolved in THF and precipitated in hexane. The precipitate was filtered and dried in a vacuum oven for two days at 50° C. Yield 8 g (92.2%). GPC (Polystyrene standards; THF eluent): Number average molecular weight, Mn=24330; Weight average molecular weight, Mw=63477. IR (KBr) cm$^{-1}$: 3453(b), 3058(s), 3027(s), 1761(s), 1711(w), 1677(s), 1630(w), 1601(s), 1495(ss), 1444(w), 1411(s), 1368(s), 1312(s), 1223(s), 1180(s), 1148(s), 1113(s), 965(s), 758(s), 700(ss) and 521(s). [b=broad, s=sharp, ss=sharp and strong, w=weak].

Example 4

Phenyl acetic acid (5 g, 0.0367 mol) was added to a RB flask followed by phosphorus pentoxide (10.43 g, 0.0367 mol). The flask was fitted with a drying tube after adding 45 ml of methane sulfonic acid. The mixture was heated at 80° C. for 3 h. Then the temperature was raised to 110° C. After 1.5 h a swollen mass was obtained. Another 20 ml of methane sulfonic acid was added. The mass swelled still further. Another 20 ml of methane sulfonic acid was added and held at 110° C. for 24 h. The flask was then cooled down to room temperature and the contents of the flask were transferred into 2000 ml of water. The solid obtained was filtered, washed repeatedly with hot water followed by water at ambient temperature until it showed neutral pH and then dried in a vacuum oven for two days at 50° C. The polymer thus obtained was insoluble in THF and other solvents. Yield 4.3 g (quantitative). IR (KBr) cm$^{-1}$: 3431(b), 3064(w), 1678(s), 1603(ss), 1417(w), 1361(w), 1298(w), 1194(ss), 1049(s), 960(s), 779(s), 698(w) and 532(w).

Example 5

2-Thiophene acetic acid (2 g, 0.014 mol) and phosphorus pentoxide (4 g, 0.014 mol) mixture was cooled in an ice bath. Methane sulfonic acid (25 ml) was added followed by dichloromethane (25 ml). The mixture was allowed to warm up to room temperature and then stirred at room temperature for 15 h. Dichloromethane was removed under vacuum and then the reaction mixture was poured into excess water. The dark brown precipitate was filtered, washed repeatedly with water and dried. The solid was insoluble in THF. It was dissolved in dimethyl sulfoxide and precipitated in excess methanol. Yield 1.5 g (86%). IR (KBr) cm$^{-1}$: 3455(b), 2927(w), 1713(w), 1654(ss), 1534(w), 1451(s), 1304(w), 1223(s), 1064(s).

Example 6

DL-2-phenylglycine (45.3 g, 0.3 mol) and phthalic anhydride (44.5 g, 0.3 mol) were stirred in glacial acetic acid (250 ml) for 2 h. The mixture was then refluxed for 15 h. Glacial acetic acid was removed under vacuum in a rotary evaporator. N-Phthaloyl-DL-2-phenylglycine was obtained as a white crystalline solid. The white crystalline solid was then thoroughly washed with water and dried. Yield 80 g (95%). IR (KBr) cm$^{-1}$: 3467(b), 1774(w), 1715(ss), 1385(s), 1335(w), 1241(w), 1103(s), 1076(s), 945(w), 896(w), 719(s), 649(w), 531(w).

Example 7

N-Phthaloyl-DL-2-phenylglycine (25 g, 0.09 mol), phosphorus pentoxide (26 g, 0.092 mol) and methane sulfonic acid (125 ml) were heated at 55° C. for 24 h in a 250 ml RB flask fitted with a guard tube. The flask was cooled and the contents were poured into 2 L water. The solid obtained was filtered, washed repeatedly with water followed by methanol and dried. Yield 20 g (85.5%). GPC (Polystyrene standards; THF eluent): Number average molecular weight, $M_n$=9722; Weight average molecular weight, $M_w$=15777. IR (KBr) cm$^{-1}$: 3470(b), 3062(w), 1771(w), 1716(b, ss), 1612(w), 1504(w), 1486(w), 1385(s), 1106(s), 1085(s), 1020(w), 893 (w), 794(w), 720(s), 639(w), 531(w).

The following references are cited in this documents and incorporated by reference herein:
1. V. Lubczyk et al., Journal of Medicinal Chemistry, 2003, 46, 1484–1491.
2. J. E. Gano et al., Journal of Organic Chemistry, 2003, 68, 3710–3713.
3. V. Lubczyk et al., Journal of Medicinal Chemistry, 2002, 45, 5358–5364.
4. K. Krohn et al., Journal of Medicinal Chemistry, 1989, 32, 1532–1538.
5. W. J. Middleton et al., Journal of the American Chemical Society, 1980, 102, 4845–4846.
6. M. Ogata et al., Journal of Medicinal Chemistry, 1987, 30, 1054–1068.
7. I. Moreno et al., European Journal of Organic Chemistry, 2002, 2126–2135.
8. J. Mosnacek et al., Macromolecules, 2004, 37, 1304–1311.
9. I. H. Jeong et al., Journal of Fluorine Chemistry, 2003, 120,195–209.
10. G. V. B. Reddy et al., European Journal of Biochemistry, 2003, 270, 284–292.
11. P-F. Xu et al., Journal of Organic Chemistry, 2003, 68, 658–661.
12. S. Kobayashi et al., Chemical Communications, 2003, 449–460.
13. X. Li et al., Macromolecules, 2003, 36, 5537–5544.
14. G. K. Surya Prakash et al., Organic Letters, 2003, 5, 3253–3256.
15. P. K. Santra et al., Journal of Molecular Catalysis A: Chemical, 2003, 197, 37–50.
16. A. Qin et al., Journal of Polymer Science: Part A: Polymer Chemistry, 2003, 41, 2846–2853.
17. P. G. Dormer et al., Journal of Organic Chemistry, 2003, 68, 467–477.
18. C. Patteux et al., Organic Letters, 2003, 5, 3061–3063.
19. B. C. Ranu et al., Tetrahedron Letters, 2003, 44, 2865–2868.
20. M. J. Meegan et al., Journal of Medicinal Chemistry, 2001, 44, 1072–1084.
21. W. M. Abdou et al., Heteroatom Chemistry, 1999, 10, 481–487.
22. G. M. Anstead et al., Journal of Medicinal Chemistry, 1988, 31, 1754–1761.
23. A. P. Sharma et al., Journal of Medicinal Chemistry, 1990, 33, 3222–3229.
24. EP Patent Application 0 895 991.

What is claimed is:

1. A process for preparing a modifiable poly (aralkyl ketone) having at least one active methylene group in the main chain comprising reacting at least one aralkanoic acid in the presence of an alkane or aryl sulfonic acid and a condensing agent.

2. The process according to claim 1 wherein the at least one aralkanoic acid is a single aralkanoic acid.

3. The process according to claim 1, wherein the at least one aralkanoic acid is a compound of the formula (I)

$$Ar_m\text{—}(CX_2)_n\text{—}COOH \quad (I),$$

wherein m is an integer from 1 to 6 and n is 1 or 2;

$Ar_m$ is an optionally substituted aromatic moiety; and

X is selected from a group of substituents so that the group —$(CX_2)_n$— is an electron donating group providing electron density to the aromatic ring.

4. The process according to claim 3 wherein $Ar_m$ is selected from the group consisting of an optionally substituted benzenoid aromatic compound, an optionally substituted non-benzenoid aromatic compound and an optionally substituted heterocyclic aromatic compound.

5. The process according to claim 4 wherein $Ar_m$ is selected from the group consisting of

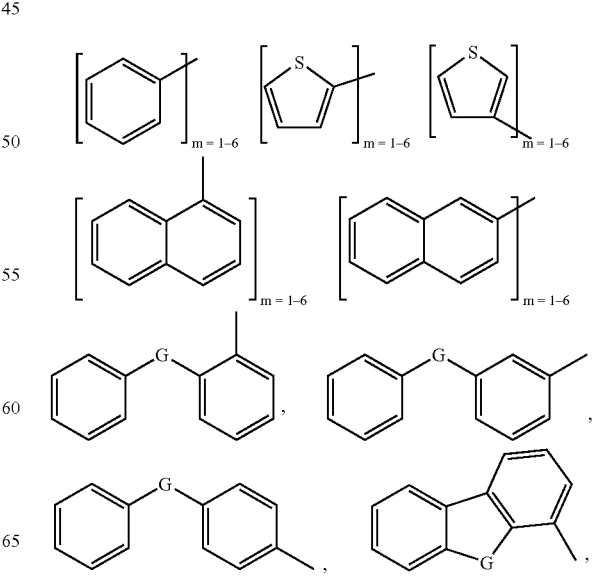

-continued

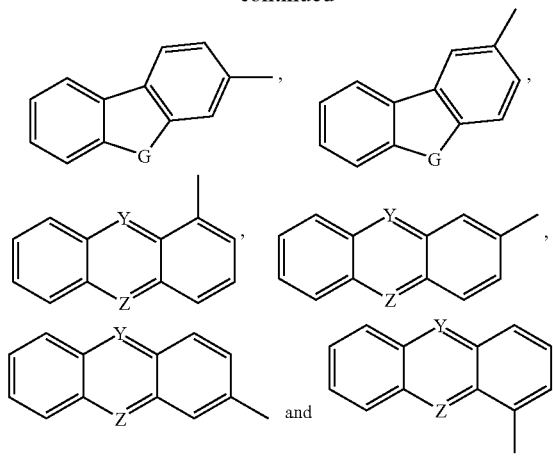

and wherein G is selected from the group consisting of —CH₂—, —CH— O, S and NH; and Y and Z are independently selected from the group consisting of —CH—, —CH₂—, O, S and N, and wherein the aromatic group can be optionally substituted.

6. The process according to claim 4 wherein the at least one aralkanoic acid is selected from the group consisting of phenyl acetic acid, phenyl propionic acid thiophene-2-acetic acid, thiophene-3-acetic acid, biphenyl-2-acetic acid, biphenyl-3-acetic acid, biphenyl-4-acetic acid, bithiophene-2-acetic acid, bithiophene-3-acetic acid, terthiophene-2'-acetic acid, and terthiophene-3'-acetic acid.

7. The process according to claim 3 wherein X is independently selected from the group consisting of —H, alkyl, alkoxyl, substituted aryls and amines.

8. The process according to claim 7 wherein at least one X is —H.

9. The process according to claim 1 wherein the alkane sulfonic acid is a C1–C4 alkane sulfonic acid.

10. The process according to claim 9 wherein the alkane sulfonic acid is methane sulfonic acid.

11. The process according to claim 1 wherein the aryl sulfonic acid is a C6–C9 aryl sulfonic acid.

12. The process according to claim 11 wherein the aryl sulfonic acid is benzene sulfonic acid.

13. The process according to claim 1 wherein the condensing agent is selected from the group consisting of phosphorus pentoxide, thionyl chloride, methane sulfonic anhydride and mixtures thereof.

14. The process according to claim 13 wherein the condensing agent is phosphorus pentoxide.

15. The process according to claim 1 further comprising a modification step selected from the group consisting of reactions involving the aromatic ring, reactions involving the methylene group(s), and reactions involving the carbonyl group of the prepared polymer.

16. A modifiable poly(aralkyl ketone) obtainable by the process according to claim 1.

17. The modifiable poly(aralkyl ketone) according to claim 16 wherein the modifiable poly(aralkyl ketone) is modified by reactions involving the aromatic ring.

18. The modifiable poly(aralkyl ketone) according to claim 17 wherein the modification reaction is an aromatic electrophilic substitution reaction.

19. The modifiable poly(aralkyl ketone) according to claim 16 wherein the modifiable poly(aralkyl ketone) is modified by reactions involving the methylene group(s).

20. The modifiable poly(aralkyl ketone) according to claim 19 wherein the modification reaction is selected from the group consisting of an alkylation of the methylene group(s), an arylation of the methylene group(s), a halogenation of the methylene group(s) and an oxidation of the methylene group(s).

21. The modifiable poly(aralkyl ketone) according to claim 16 wherein the modifiable poly(aralkyl ketone) is modified by reactions involving the carbonyl group.

22. The modifiable poly(aralkyl ketone) according to claim 21 wherein the modification reaction is selected from the group consisting of a reduction of the carbonyl group to a methylene group, a reduction of the carbonyl group to secondary alcohol, a reduction of the carbonyl group to secondary alcohol followed by dehydration leading to poly(phenylene vinylene)s, and trifluoromethylation of the carbonyl group to a tertiary alcohol.

23. The modifiable poly(aralkyl ketone) according to claim 21 wherein the modification reaction is a Grignard addition involving alkyl magnesium halide to the carbonyl group leading to tertiary alcohol.

24. The modifiable poly(aralkyl ketone) according to claim 21 wherein the modification reaction is a Grignard addition involving aryl magnesium halide to the carbonyl group leading to tertiary alcohol.

25. The modifiable poly(aralkyl ketone) according to claim 21 wherein the modification reaction is a Grignard addition involving alkyl magnesium halide to the carbonyl group resulting in tertiary alcohol which upon subsequent dehydration yields poly(phenylene vinylene)s with alkyl substituents on the vinylene carbon.

26. The modifiable poly(aralkyl ketone) according to claim 21 wherein the modification reaction is a Grignard addition involving aryl magnesium halide to the carbonyl group resulting in tertiary alcohol which upon subsequent dehydration yields poly(phenylene vinylene)s with aryl substituents on the vinylene carbon.

27. The modifiable poly(aralkyl ketone) according to claim 21 wherein the modification reaction is trifluoromethylation, involving reaction with a trifluoromethylation agent to give the tertiary hydroxyl group.

28. The modifiable poly(aralkyl ketone) according to claim 27, wherein the polymer carrying the trifluoromethyl group is dehydrated to yield poly(phenylene vinylene)s with trifluoromethyl groups on the vinylic carbon atom.

29. The modifiable poly(aralkyl ketone) according to claim 21, wherein the modification reaction is difluorination, involving reaction with a fluorination agent to give a polymer with CF₂ main chain residues.

30. The modifiable poly(aralkyl ketone) according to claim 19 wherein the modification reaction is a Friedlander annulation reaction involving the reaction between poly(aralkyl ketones and an aromatic alpha amino carbonyl compound leading to polymeric nitrogen containing heterocylces.

31. The modifiable poly(aralkyl ketone) according to claim 19 wherein the modification reaction is a reaction between poly(aralkyl ketone) and an alkyne in the presence of a Lewis acid catalyst leading to polymeric substituted naphthalene(s).

32. The modifiable poly(aralkyl ketone) according to claim 21 wherein the modification reaction is a Friedlander annulation reaction involving the reaction between poly (aralkyl ketone) and an aromatic alpha amino carbonyl compound leading to polymeric nitrogen containing heterocylces.

33. The modifiable poly(aralkyl ketone) according to claim 21 wherein the modification reaction is a reaction between poly(aralkyl ketone) and an alkyne in the presence of a Lewis acid catalyst leading to polymeric substituted naphthalene(s).

34. The modifiable poly(aralkyl ketone) according to claim 16 wherein the modifiable poly(aralkyl ketone)s is modified by photoreaction(s).

35. The modifiable poly(aralkyl ketone) according to claim 16 wherein the modifiable poly(aralkyl ketone) is modified by thermal reaction(s).

36. A process for preparing a modifiable poly(aralkyl ketone) having active methylene group(s) in the main chain comprising reacting at least one derivative of an aralkanoic acid in the presence of a Lewis acid catalyst and a solvent.

37. The process of claim 36 wherein the at least one derivative of an aralkanoic acid is an acid halide.

38. The process according to claim 37 wherein the acid halide of an aralkanoic acid is a compound of the formula (II)

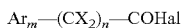

$$Ar_m-(CX_2)_n-COHal \qquad (II),$$

wherein m is an integer from 1 to 6 and n is 1 or 2;
Hal is chloride, bromide, fluoride or iodide;
$Ar_m$ is an aromatic moiety; and
X is selected from a group of substituents so that the group $-(CX_2)_n-$ is an electron donating group providing electron density to the aromatic ring.

39. The process according to claim 38 wherein $Ar_m$ is selected from the group consisting of an optionally substituted benzenoid aromatic compound, an optionally substituted non-benzenoid aromatic compound and an optionally substituted heterocyclic aromatic compound.

40. The process according to claim 38 wherein $Ar_m$ is selected from the group consisting of

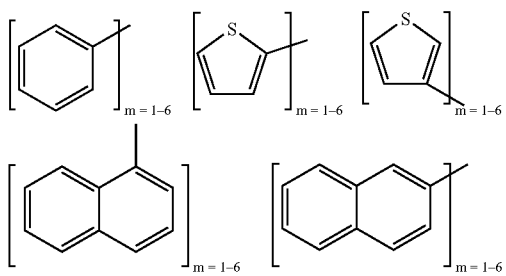

-continued

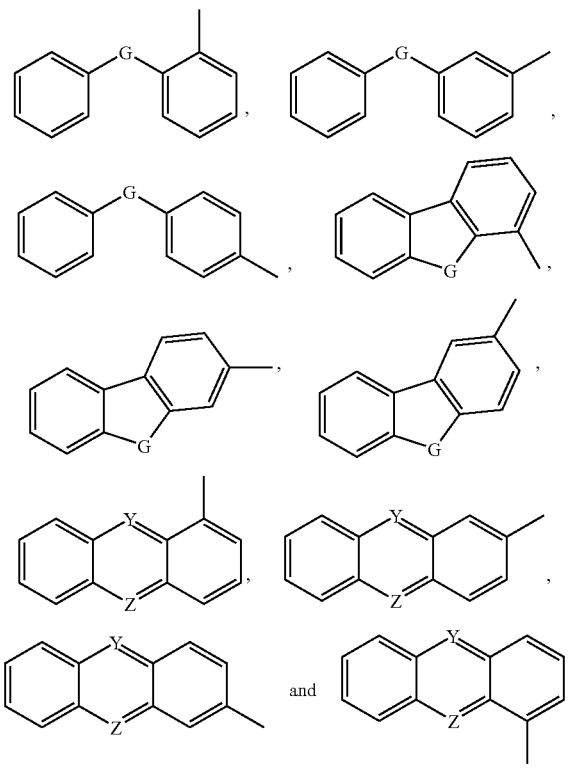

wherein G is selected from the group consisting of $-CH_2-$, $-CH-$, O, S and NH; and
Y and Z are independently selected from the group consisting of $-CH-$, $-CH_2-$, O, S and N.

41. The process of claim 38 wherein the polymerisation catalyst is selected from the group consisting of aluminium chloride, boron trifluoride, and a metal triflate.

* * * * *

UNITED STATES PATENT AND TRADEMARK OFFICE
CERTIFICATE OF CORRECTION

PATENT NO. : 7,034,187 B2  Page 1 of 1
APPLICATION NO. : 10/859689
DATED : April 25, 2006
INVENTOR(S) : Anbanandam Parthiban It is certified that error appears in the above-identified patent and that said Letters Patent is hereby corrected as shown below:

On the Title Page, under item "(75) Inventor:" Change "Jurong Island" to --Singapore--

Signed and Sealed this

Twenty-second Day of August, 2006

JON W. DUDAS
*Director of the United States Patent and Trademark Office*